USOO5610757A

United States Patent [19]
Ji et al.

[11] Patent Number: 5,610,757
[45] Date of Patent: Mar. 11, 1997

[54] THIN FILM ACTUATED MIRROR ARRAY FOR USE IN AN OPTICAL PROJECTION SYSTEM

[75] Inventors: Jeong-Beom Ji; Dong-Seon Yoon, both of Seoul, Rep. of Korea

[73] Assignee: Daewoo Electronics Co., Ltd., Seoul, Rep. of Korea

[21] Appl. No.: 504,967

[22] Filed: Jul. 20, 1995

[30] Foreign Application Priority Data

Oct. 31, 1994 [KR] Rep. of Korea .................. 94-28331

[51] Int. Cl.$^6$ ............................................. G02B 26/00
[52] U.S. Cl. ..................... 359/295; 359/291; 359/224; 359/849; 359/850
[58] Field of Search ............................ 359/212, 213, 359/214, 223, 224, 247, 290, 291, 295, 318, 846, 847, 848, 849, 850, 851

[56] References Cited

U.S. PATENT DOCUMENTS

| | | | |
|---|---|---|---|
| 3,544,201 | 12/1970 | Fowler et al. | 350/285 |
| 4,441,791 | 4/1984 | Hornbeck | 359/295 |
| 4,615,595 | 10/1986 | Hornbeck | 353/122 |
| 4,793,699 | 12/1988 | Tokuhara | 350/487 |
| 5,085,497 | 2/1992 | Um et al. | 359/848 |
| 5,126,836 | 6/1992 | Um | 358/60 |
| 5,159,225 | 10/1992 | Um | 310/328 |
| 5,172,262 | 12/1992 | Hornbeck | 359/223 |
| 5,175,465 | 12/1992 | Um et al. | 310/328 |
| 5,185,660 | 2/1993 | Um | 358/60 |
| 5,247,222 | 9/1993 | Engle | 310/328 |
| 5,481,396 | 1/1996 | Ji et al. | 359/295 |
| 5,493,439 | 2/1996 | Engle | 359/295 |
| 5,535,047 | 7/1996 | Hornbeck | 359/295 |

FOREIGN PATENT DOCUMENTS

| | | |
|---|---|---|
| 2239101 | 6/1991 | United Kingdom. |
| 2258055 | 1/1993 | United Kingdom. |
| WO91/09503 | 9/1991 | WIPO. |

*Primary Examiner*—Georgia Y. Epps
*Assistant Examiner*—Dawn-Marie Bey
*Attorney, Agent, or Firm*—Pennie & Edmonds

[57] ABSTRACT

An array of M×N thin film actuated mirrors comprises a switching matrix, an array of M×N pairs of supporting members, and an array of M×N actuating structures, wherein the active matrix includes a substrate and a first, a second and a third conduction line patterns printed on top thereof, and each of the actuating structures is provided with a pair of actuators and a pair of gate actuators. With the presence of the gate actuators in each of the actuating structures in conjunction with the first, the second and the third conduction line patterns on the switching matrix, it is possible to eliminate the use of transistors in the array of M×N thin film actuated mirrors.

10 Claims, 7 Drawing Sheets

THIN FILM ACTUATED MIRROR ARRAY FOR USE IN AN OPTICAL PROJECTION SYSTEM

FIELD OF THE INVENTION

The present invention relates to an optical projection system; and, more particularly, to an array of M×N thin film actuated mirrors for use in the system.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1 and 2, there are shown a cross sectional and a perspective views, respectively, of an array 10 of M×N thin film actuated mirrors 11 for use in an optical projection system, disclosed in a copending commonly owned application, U.S. Ser. No. 08/340,762, entitled "ARRAY OF THIN FILM ACTUATED MIRRORS FOR USE IN AN OPTICAL PROJECTION SYSTEM AND METHOD FOR THE MANUFACTURE THEREOF", comprising an active matrix 12, an array 13 of M×N thin film actuating structures 14, an array 15 of M×N supporting members 16 and an array 17 of M×N mirror layers 18.

The active matrix 12 includes a substrate 19, an array of M×N transistors(not shown) and an array 20 of M×N connecting terminals 21. Each of the actuating structures 14 in the array 10 is provided with a first and a second actuating parts 22(a), 22(b) and a center part 22(c) therebetween, the first and second actuating parts 22(a), 22(b) being identically structured, wherein each of the first and second actuating parts 22(a), 22(b) has at least a thin film layer 23 of an electrodisplacive material, e.g., piezoelectric material, including a top and a bottom surfaces 24, 25, an elastic layer 26 having a bottom surface 41, and a first and a second electrodes 28, 29. The elastic layer 26 is placed on the top surface 24 of the electrodisplacive thin film layer 23. The first and second electrodes 28, 29 are located on the top and bottom surfaces 24, 25 of the electrodisplacive thin film layer 23, respectively, wherein an electrical signal applied across the electrodisplacive thin film layer 23 located between the first and second electrodes 28, 29 causes a deformation thereof, and hence the actuating parts 22(a), 22(b). Each of the supporting members 16 is used for holding each of the actuating structures 13 in place and also for electrically connecting each of the actuating structures 14 with the active matrix 12. Each of the mirror layers 18 includes a first side 30, a second opposing side 31, and a center portion 32 therebetween as shown in FIG. 2, wherein the first side 30, the second opposing side 31 and the center portion 32 of each of the mirror layers 18 are secured on top of the first, second actuating and center parts 22(a), 22(b), 22(c) of each of the actuating structures 14, respectively, such that when the first and second actuating parts 22(a), 22(b) in each of the actuating structures 14 deform in response to the electrical signal, the center part 22(c) in each of the actuating structures 13, and hence the center portion 32 of the corresponding mirror layer 18, tilts while remaining planar, thereby allowing all of the center portion 32 to reflect the light beams, resulting in an increased optical efficiency.

One of the major shortcomings of the above described array 10 of thin film actuated mirrors 11 is that it incorporates therein the active matrix 12 including the array of transistors for providing driving and image signals to each of the thin film actuated mirrors 11 to thereby elevate the cost of manufacturing the array 10 too high.

SUMMARY OF THE INVENTION

It is, therefore, an object of the present invention to provide an array of M×N thin film actuated mirrors which dispenses with an array of M×N transistors, included in an active matrix, for providing driving and image signals to each of the thin film actuated mirrors.

It is another object of the present invention to provide an array of M×N thin film actuated mirrors including therein a novel means for providing driving and image signals to each of the thin film actuated mirrors.

It is a further object of the present invention to provide an array of M×N thin film actuated mirrors, each of the thin film actuated mirrors utilizing a pair of gate actuators.

In accordance with one aspect of the present invention, there is provided an array of M×N thin film actuated mirrors for use in an optical projection system, said array comprising: a switching matrix comprising a substrate having a top surface and provided with a first, a second and a third conduction line patterns formed on the top surface, wherein the first and the second conduction line patterns are connected to an outside source and are used for carrying an image signal and a driving signal, respectively, and the third conduction line pattern is used for providing the image signal to each of the thin film actuated mirrors; an array of M×N pairs of supporting members, wherein each of the supporting members is placed on top of the third conduction line pattern; and an array of M×N actuating structures, each of the actuating structures including a first, a second, a center, a third and fourth tab portions, each of the tab portions being separated from each other by a gap inbetween, each of the actuating structures further including a reflecting layer, an elastic layer and an electrodisplacive layer, each of the actuating structures still further including a pair of actuators and a pair of gate actuators, each of the actuators and the gate actuators having a proximal and a distal ends, each of the actuators in the pair being located either below the first and the fourth tab portions if each of the gate actuators in the pair is located below the second and the third tab portions, respectively, or below the second and the third tab portions if each of the gate actuators in the pair is located below the first and fourth tab portions, respectively, each of the actuators in the pair and each of the gate actuators in the pair being cantilevered from each of the supporting members by the proximal end thereof, each of the gate actuators being further being provided with an insulating layer attached on bottom thereof at the distal end and a contact layer attached on bottom of the insulating layer, wherein the driving signal provided through the second conduction line pattern is applied to each of the gate actuators, causing the pair of gate actuators to bend downward, thereby forcing the contact layer on each of the gate actuators to come in contact with the first and the third conduction line patterns to thereby allow the image signal from the first conduction line pattern to be transmitted to the third conduction line pattern, and hence to each of the actuators, causing the pair of actuators in each of the actuating structures to tilt, resulting in the center tab portion thereof to tilt while remaining planar, thereby allowing the center tab portion in its entirety to reflect the light beams.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 1:
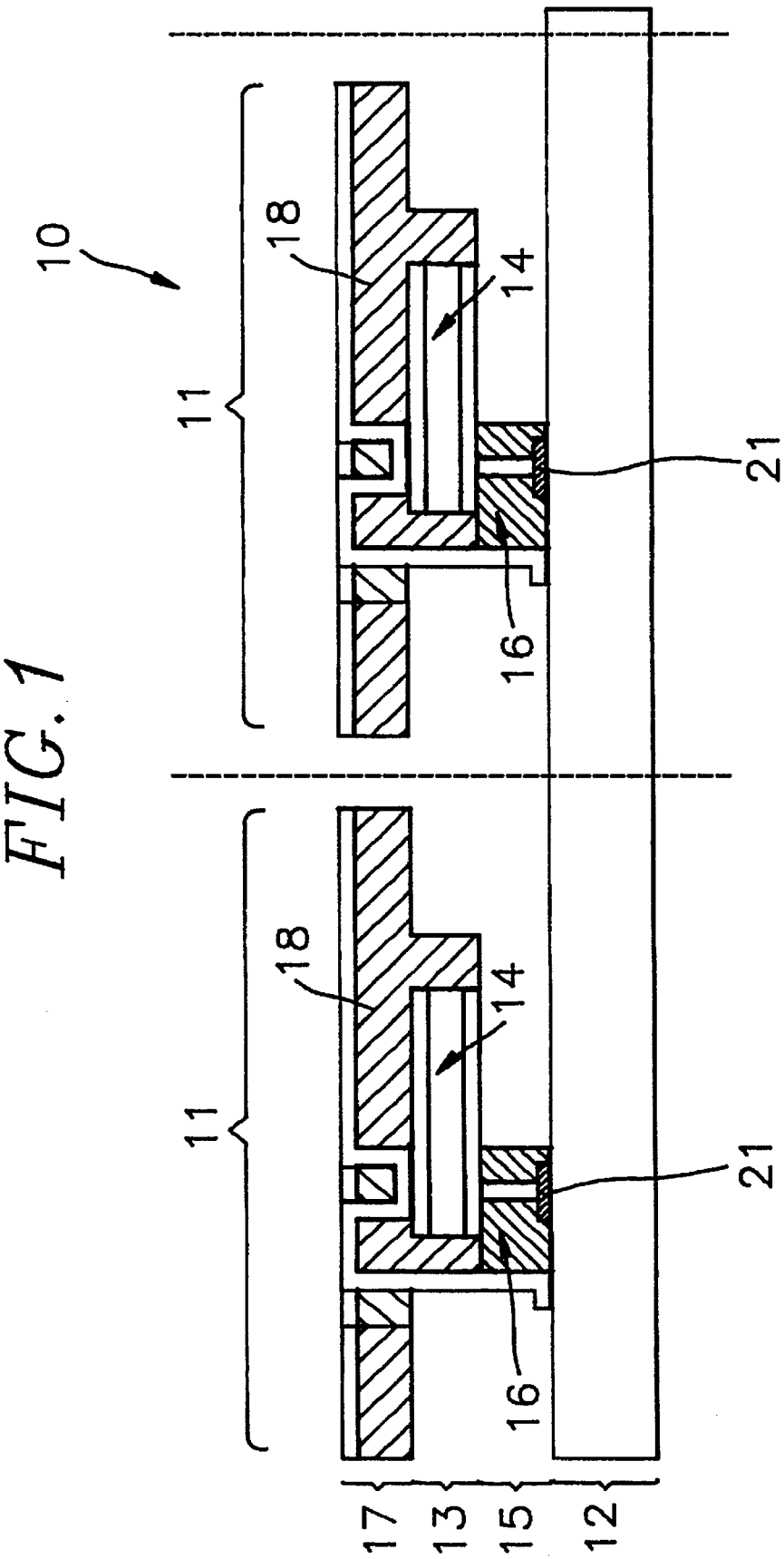
FIG. 1 represents a cross sectional view of an array of M×N thin film actuated mirrors previously disclosed.
Figure 2:
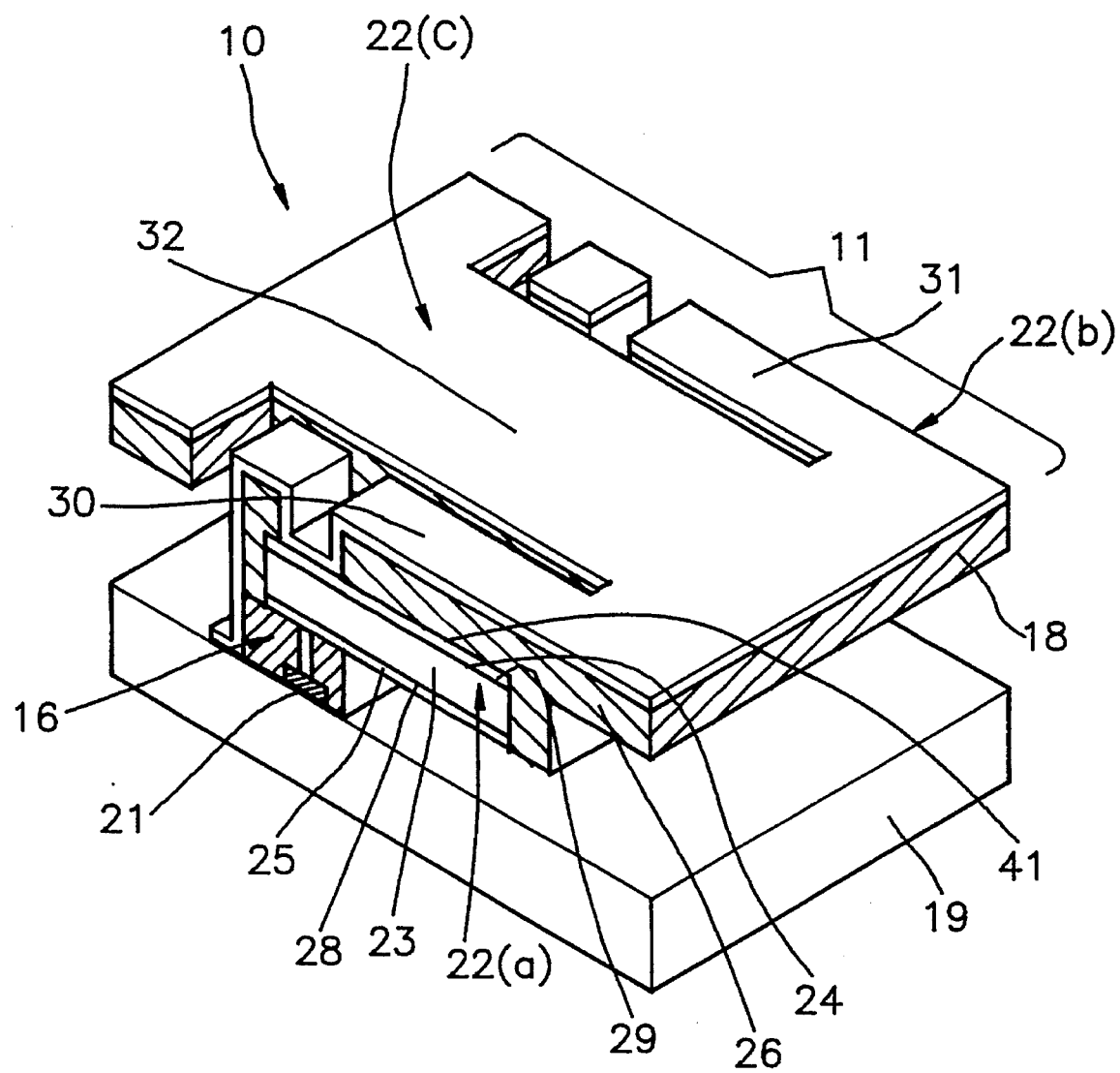
FIG. 2 illustrates a perspective view of the array of M×N thin film actuated mirrors shown in FIG. 1.

Referring now to FIGS. 3 to 7, there are provided various views of the inventive array of M×N film actuated mirrors for use in an optical projection system, wherein M and N are integers, in accordance with the preferred embodiments of the present invention. It should be noted that like parts appearing in FIGS. 3 to 7 are represented by like reference numerals.

Figure 3:
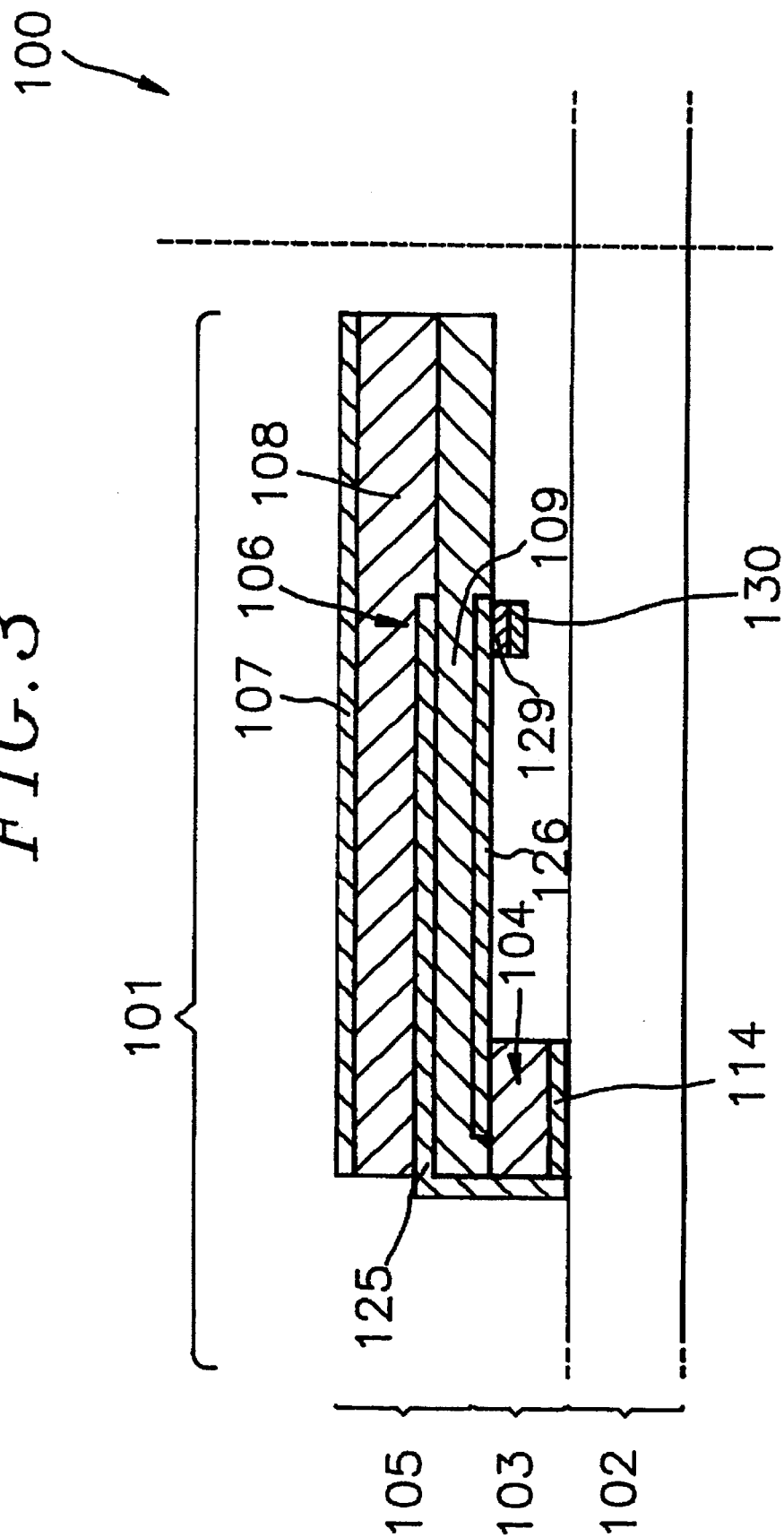
FIG. 3 provides a cross sectional view of array of M×N thin film actuated mirrors in accordance with the preferred embodiment of the present invention.

In FIG. 3, there is illustrated a cross sectional view of an array 100 of M×N thin film actuated mirrors 101 for use in an optical projection system, comprising a switching matrix 102, an array 103 of M×N pairs (not shown) of supporting members 104, and an array 105 of M×N actuating structures 106.

As shown in FIG. 3, each of the actuating structures 106 includes a reflecting layer 107 made of a light reflecting material, e.g., aluminum(Al), an elastic layer 108 made of an insulating material, e.g., silicon nitride($Si_3N_4$), and an electrodisplacive layer 109 made of a piezoelectric material, e.g., lead zirconium titanate(PZT), or an electrostrictive material, e.g., lead magnesium niobate(PMN).

Figure 4:
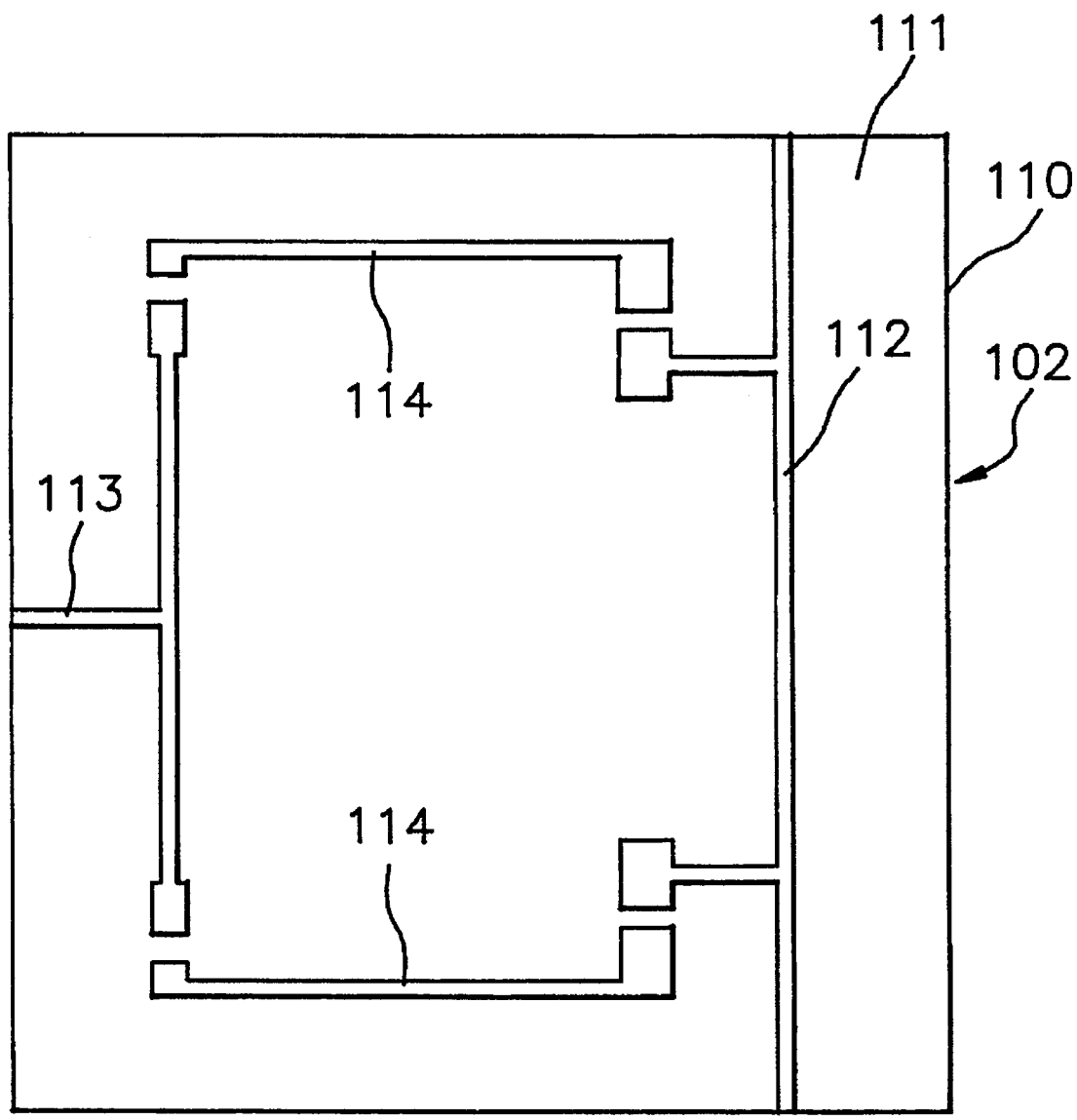
FIG. 4 presents a partial top view of a switching matrix to be used in the inventive array of M×N thin film actuated mirrors shown in FIG. 3.

The switching matrix 102 includes a substrate 110 having a top surface 111 and is made of an insulating material, e.g., alumina ($Al_2O_3$). The switching matrix 102, unlike the active matrix of the previously disclosed array of M×N thin film actuated mirrors having an array of M×N transistors, is provided with a first, a second and a third conduction line patterns 112, 113, 114 formed on the top surface 111 thereof as shown in FIG. 4, wherein the first and the second conduction line patterns 112, 113 are connected to an outside source (not shown) and are used for carrying an image signal and a driving signal, respectively, and the third conduction line pattern 114 is used for providing the image signal to each of the actuated mirrors 101.

Each of the supporting members 104, made of the same material as the elastic layer 109, is placed on top of the second and the third conduction line patterns 113, 114.

Figure 5:
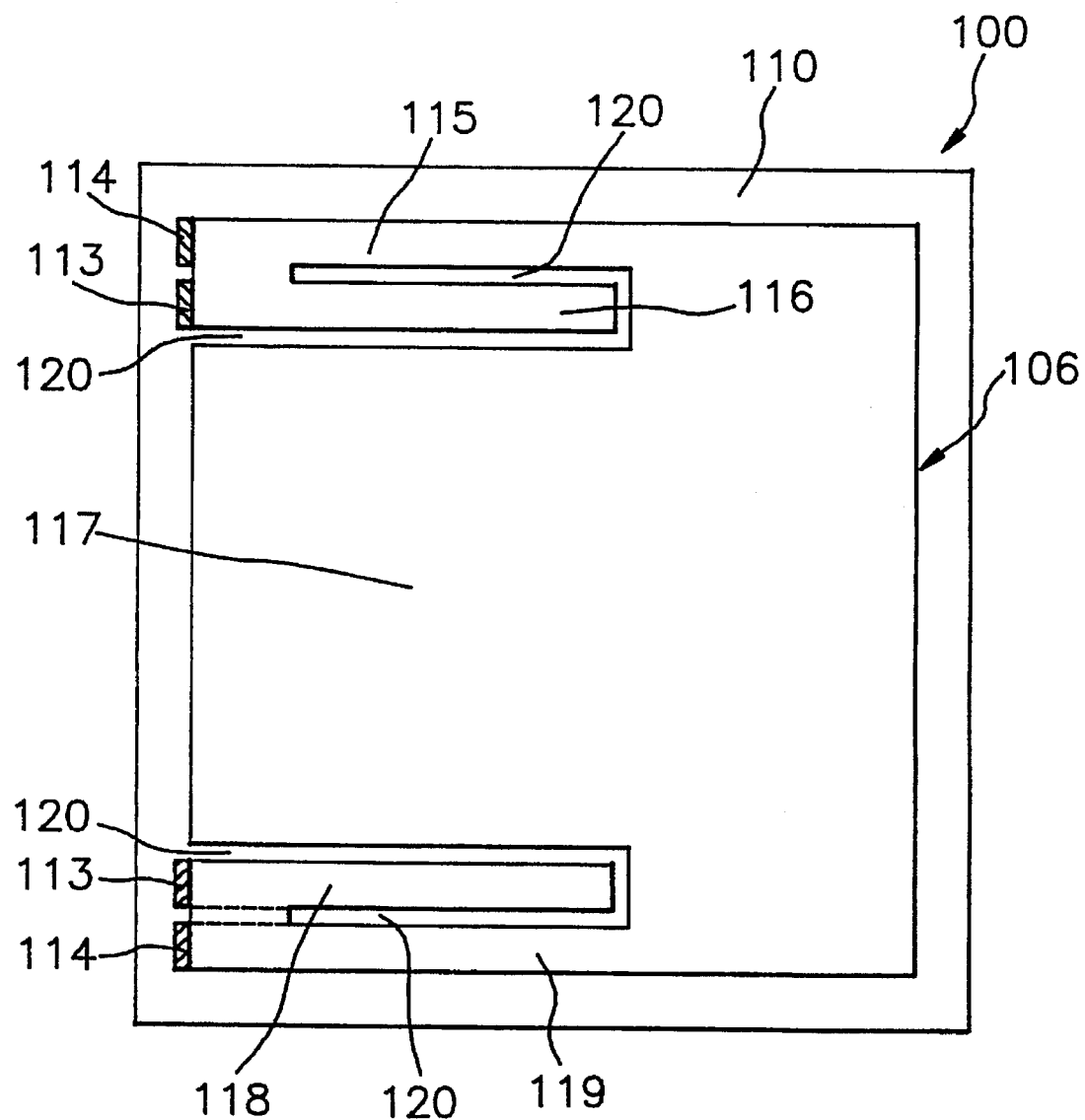
FIG. 5 offers a top view of the actuated mirror in the inventive array.

FIG. 5 represents a detailed top view of an actuating structure 106 constituting the array 100 shown in FIG. 3. Each of the actuating structures 106 includes a first, a second, a center, a third and a fourth tab portions 115, 116, 117, 118, 119, each of the tab portions being separated from each other by a gap 120 therebetween.

Figure 6:
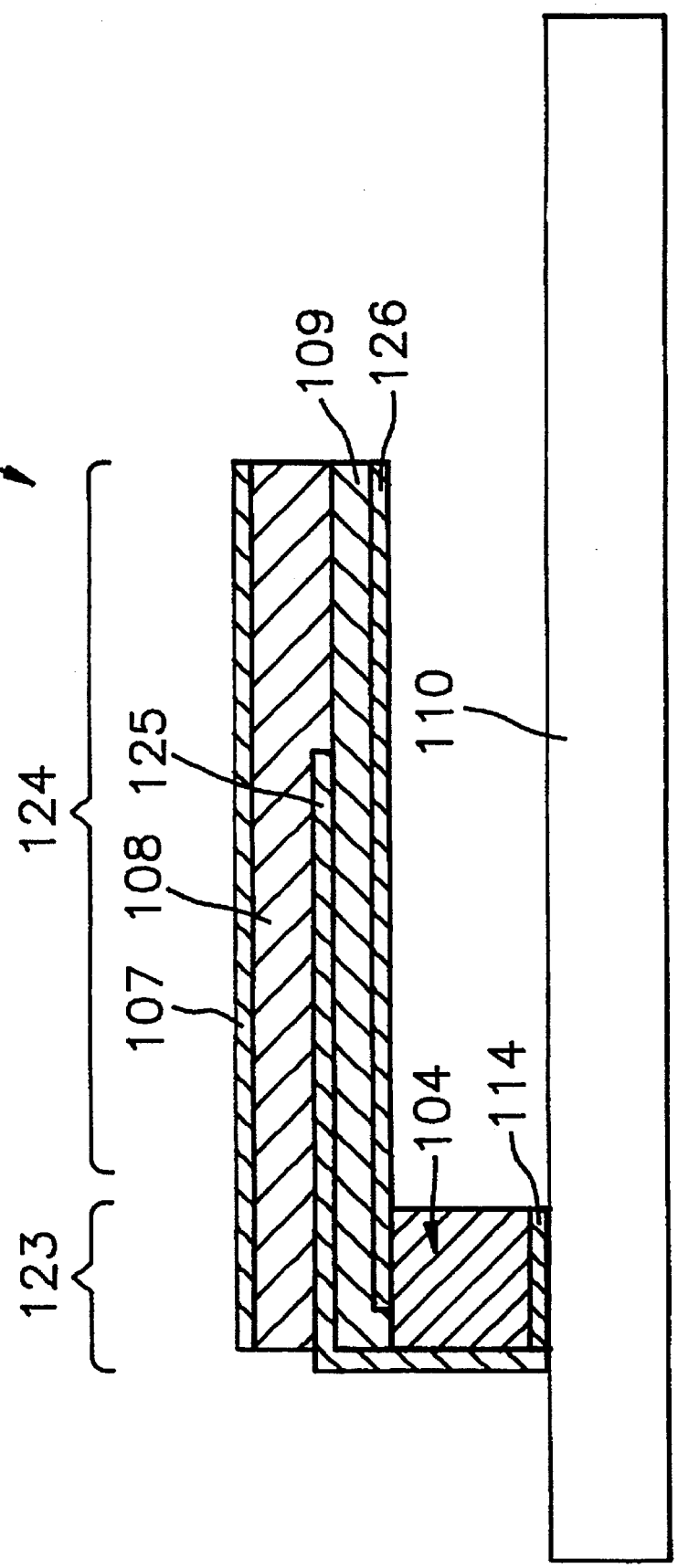
FIG. 6 displays a cross sectional view of an actuator in the inventive actuated mirror.
Figure 7:
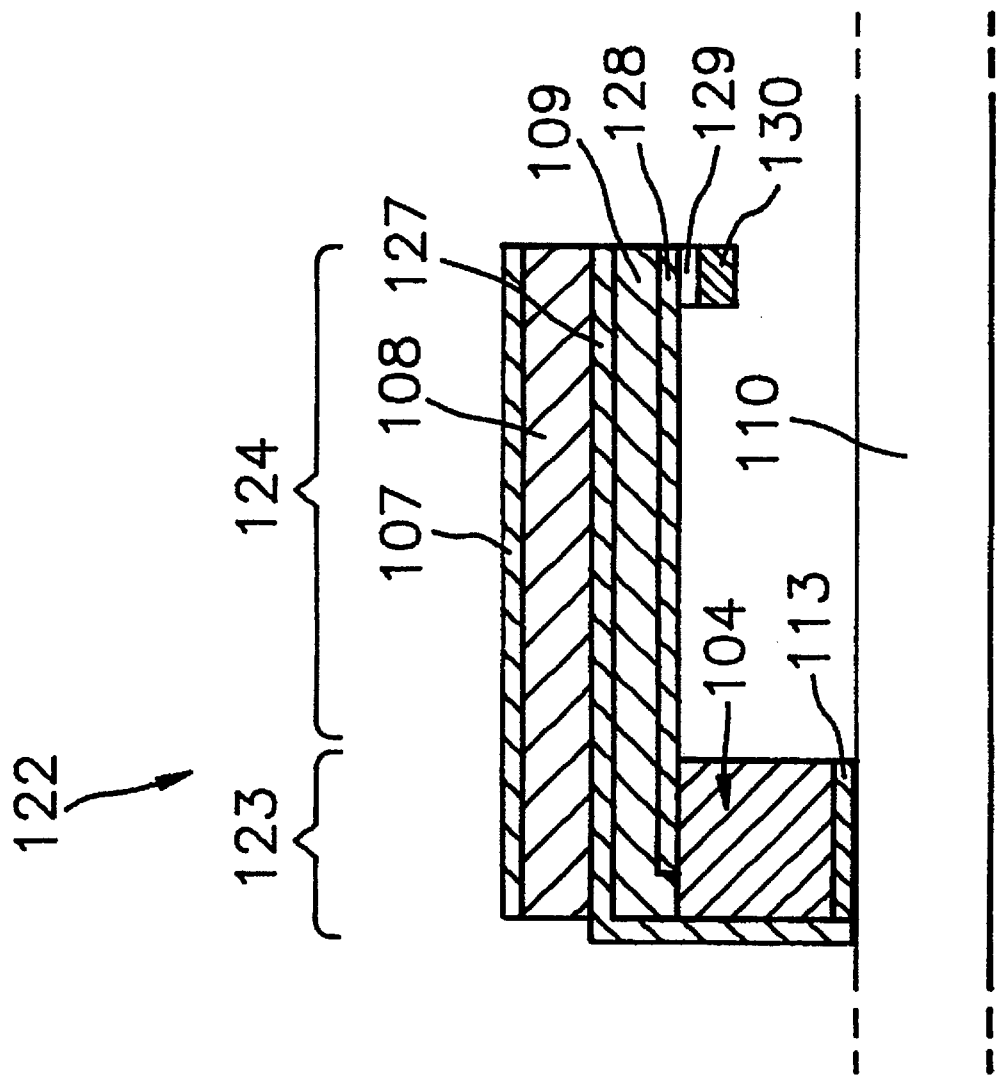
FIG. 7 depicts a cross sectional view of a gate actuator in the inventive actuated mirror.

Each of the actuating structures 106 further includes a pair of actuators 121 and a pair of gate actuators 122, whose cross sectional views are shown in FIGS. 6 and 7, respectively, wherein each of the actuators 121 and each of the gate actuators 122 are provided with a proximal and a distal ends 123, 124. As shown in FIG. 6, each of the actuators 121 includes a portion of the reflecting layer 107, a portion of the elastic layer 108, a signal electrode layer 125, a portion of the electrodisplacive layer 109 and a bias electrode layer 126, wherein the signal electrode layer 125 is electrically connected to the third conduction line pattern 114. Each of the actuators 121 is cantilevered from each of the supporting members 104 by the proximal end 123 thereof.

Furthermore, each of the gate actuators 122, as shown in FIG. 7, is provided with a portion of the reflecting layer 107, a portion of the elastic layer 108, a gate signal electrode layer 127, a portion of the electrodisplacive layer 109 and a gate bias electrode layer 128, wherein the gate signal electrode layer 127 is electrically connected to the second conduction line pattern 113. As in the case of the actuators 121, each of the gate actuators 122 is cantilevered from each of the supporting members 104 by the proximal end 123 thereof.

Each of the gate actuators 122 is further provided with an insulating layer 129 attached on bottom of the gate bias electrode layer 128 at the distal end 124 thereof and a contact layer 130 made of an electrically conducting material, e.g., silver(Ag), attached on bottom of the insulating layer 129, wherein the insulating layer 129 is used for preventing a short circuit between the gate bias electrode layer 128 and the contact layer 130.

The gate bias electrode layer 128 in each of the gate actuators 122 is electrically connected to the bias electrode layer 126 in each of the actuators 121, and hence the bias voltage applied thereto is identical.

Each of the actuators 121 in the actuating structures 106 is located either below the first and the fourth tab portions 115, 119 if each of the gate actuators 122 is located below the second and the third tab portions 116, 118, respectively, or below the second and the third tab portions 116, 118 if each of the gate actuators 122 is located below the first and the fourth tab portions 115, 119.

When the driving signal in the form of an electric potential, provided through the second conduction line pattern 113, is applied across the portion of the electrodisplacive layer 109 between the gate signal electrode layer 127 and the gate bias electrode layer 128 in each of the gate actuators 122, it leads to a deformation of the portion of the electrodisplacive layer 109 as a result of the electric field developed from the potential difference between the driving signal voltage and the bias voltage. The deformation of the portion of the electrodisplacive layer 109 will, in turn, lead to a development of an internal stress at the boundary between the portion of the electrodisplacive layer 109 and the portion of the elastic layer 108. If the portion of the electrodisplacive layer 109 is made a thin film poled piezoelectric material, this will cause the corresponding gate actuator to bend, whose bending direction being dependent on the polarity of the electric field. If the driving signal voltage is greater than the bias voltage, it results in a downward bending of the corresponding gate actuators. On the other hand, if the driving signal voltage is less than the bias voltage, it results in an upward bending of the corresponding gate actuator 122. On the other hand, if the portion of the electrodisplacive layer 109 is made of a thin film unpoled piezoelectric material, this will cause the corresponding gate actuator to bend downward. The downward bending of the pair of gate actuators 122 forces the contact layer 130 on each of the gate actuators 122 to come in contact with the first and the third conduction line patterns 112, 114 to thereby form an electrical bridge therebetween, allowing the image signal to pass from the first conduction line pattern 112 to the third conduction line pattern 114, and hence to the signal electrode layer 125 in each of the actuators 121. Each of the actuators 121 in each of the actuating structures 126 functions under a similar principle as in the gate actuator 122. Once the image signal is applied across the portion of the electrodisplacive layer 109 between the signal electrode layer 125 and the bias electrode layer 126 in each of the actuators 121, it causes a deformation of the portion of the electrodisplacive layer 109 in the pair of actuators 121, which will, in turn, cause the center tab portion 117 located therebetween in the corresponding actuating structures 106 to tilt while remaining planar, thereby allowing all of the center tab portion 117 being used to reflect the light beams.

The inventive array 100 of M×N thin film actuated mirrors 101 utilizes the pair of gate actuators 122 in each of the actuating structures 106 and the switching matrix including the first, the second and the third conduction line patterns 112, 113, 114 to provide the driving and image signals to each of the actuated mirrors 101, unlike the previously described array 10 of M×N thin film actuated mirrors 11, wherein the active matrix including the array of M×N transistors is used.

While the present invention has been described with respect to certain preferred embodiments only, other modifications and variations may be made without departing from the scope of the present invention as set forth in the following claims.

What is claimed is:

1. An array of M×N thin film actuated mirrors for use in an optical projection system, said array comprising:
    a switching matrix including a substrate having a top surface and provided with a first, a second and a third conduction line patterns formed on the top surface, wherein the first and the second conduction line patterns are connected to an outside circuit and are used for carrying an image signal and a driving signal, respectively, and the third conduction line pattern is used for providing the image signal to each of the thin film actuated mirrors;
    an array of M×N pairs of supporting members, wherein each of the supporting members is placed on top of the second and the third conduction line patterns; and
    an array of M×N actuating structures, each of the actuating structures including a first, a second, a center, a third and a fourth tab portions, each of the tab portions being separated from each other by a gap inbetween, each of the actuating structures further including a reflecting layer, an elastic layer and an electrodisplacive layer, each of the actuating structures still further including a pair of actuators and a pair of gate actuators, each of the actuators and the gate actuators having a proximal and a distal ends, each of the actuators in the pair being located either below the first and the fourth tab portions if each of the gate actuators in the pair is located below the second and the third tab portions, respectively, or below the second and the third tab portions if each of the gate actuators in the pair is located below the first and fourth tab portions, respectively, each of the actuators in the pair and each of the gate actuators in the pair being cantilevered from each of the supporting members by the proximal end thereof, each of the gate actuators being further being provided with an insulating layer attached on bottom thereof at the distal end and a contact layer attached on bottom of the insulating layer, wherein the driving signal provided through the second conduction line pattern is applied to each of the gate actuators, causing the pair of gate actuators to bend downward, thereby forcing the contact layer on each of the gate actuators to come in contact with the first and the third conduction line patterns to thereby allow the image signal from the first conduction line pattern to be transmitted to the third conduction line pattern, and hence to each of the actuators, causing the pair of actuators in each of the actuating structures to tilt, resulting in the center tab portion thereof to tilt while remaining planar, thereby allowing all of the center tab portion to be used to reflect the light beams.

2. The array of M×N thin film actuated mirrors of claim 1, wherein each of the actuators includes a portion of the reflecting layer, a portion of the elastic layer, a signal electrode layer, a portion of the electrodisplacive layer and a bias electrode layer.

3. The array of M×N thin film actuated mirrors of claim 2, wherein the signal electrode layer in each of the actuators is electrically connected to the third conduction line pattern.

4. The array of M×N thin film actuated mirrors of claim 1, wherein each of the gate actuators includes a portion of the reflecting layer, a portion of the elastic layer, a gate signal electrode layer, a portion of the electrodisplacive layer and a gate bias electrode layer.

5. The array of M×N thin film actuated mirrors of claim 4, wherein the gate signal electrode layer in each of the gate actuators is electrically connected to the second conduction line pattern.

6. The array of M×N thin film actuated mirrors of claims 2 and 4, wherein the bias electrode layer in each of the actuators is electrically connected to the gate bias electrode layer in each of the gate actuators.

7. The array of M×N thin film actuated mirrors of claim 6, wherein a voltage applied to the bias electrode layer and the gate bias electrode layer in each of the actuators and each of the gate actuators is identical.

8. The array of M×N thin film actuated mirrors of claim 1, wherein the substrate is made of an insulating material.

9. The array of M×N thin film actuated mirrors of claim 1, wherein each of the supporting members is made of an insulating material.

10. The array of M×N thin film actuated mirrors of claim 1, wherein the elastic layer is made of an insulating material.

* * * * *